United States Patent

[11] 3,582,957

| [72] | Inventor | Arne J. Herleikson |
| | | Camarillo, Calif. |
| [21] | Appl. No. | 802,528 |
| [22] | Filed | Feb. 26, 1969 |
| [45] | Patented | June 1, 1971 |
| [73] | Assignee | The United States of America as represented by the Secretary of the Navy |

[54] FREQUENCY ANALYZER
1 Claim, 4 Drawing Figs.

[52] U.S. Cl. .................................................... 346/33, 346/109, 179/1US, 324/77CS
[51] Int. Cl. .......................................................... G01r 23/18
[50] Field of Search .......................................... 346/109, 108, 107, 35, 33; 179/1 VIS, 100.3 B; 324/77 C, 77 CS; 181/0.5 APM

[56] References Cited
UNITED STATES PATENTS

| 1,994,232 | 3/1935 | Schuck | 181/0.5 |
| 2,476,445 | 7/1949 | Lacy | 179/1 |
| 2,492,062 | 12/1949 | Potter | 179/1 |
| 2,532,731 | 12/1950 | Potter | 179/1 |
| 2,629,778 | 2/1953 | Potter | 179/1 |
| 3,115,605 | 12/1963 | Coulter | 324/77 |

*Primary Examiner*—Joseph W. Hartary
*Attorneys*—Edgar J. Brower, Q. Baxter Warner and Howard J. Murray, Jr.

ABSTRACT: A system for analyzing and displaying in real time the frequency components of a complex analog signal. In a preferred embodiment, a tracking filter is periodically swept over a frequency band of interest by a sine wave received from an oscillator the operation of which is in turn controlled by a sawtooth wave generator. The output of the tracking filter is employed to intensity modulate a light beam. The modulated beam is directed to the mirror of a galvanometer, and, when this mirror is oscillated by the output of the sawtooth wave generator, the beam reflected therefrom is swept in cyclic fashion laterally across a moving film or sensitized paper to develop thereon a record of the frequency characteristics of the input energy.

3,582,957

FREQUENCY ANALYZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

During the testing and/or evaluation of many processes and components, it is customary to record the data obtained on magnetic tape for subsequent analysis. This data may pertain to acoustics, infrared, biomedical phenomena, shock and vibration studies, etc. The recorded information is frequently in analog form, and may consist of a complex wave which must be broken down into its fundamental frequencies for proper interpretation.

At the present time there are two techniques in use— (1) a system employing a bank of filters with center frequencies one-third octave apart, with the filter outputs presented as individual traces on a pen recorder. It is difficult with this method to precisely determine the frequency spectrum due to the necessarily broad bandwidth of each filter, and, in addition, the correlation of amplitude, frequency and time must be performed mentally by the operator; (2) a series of filter outputs synchronously applied to a damp paper via an electric arc between a knife edge and a helical wire on a drum rotating at relatively high speed. While accurate, this method requires precise alignment of the components, and is subject to frequent mechanical malfunctions requiring difficult and time-consuming repairs.

SUMMARY OF THE INVENTION

The present concept retains the feature of employing individual filter units arranged to pass different frequencies therethrough, but departs from previously known arrangements by commutating these filter outputs and modulating a light beam by the commutated energy. This light beam is cyclically swept across a sensitized recording medium in synchronism with each cycle of commutation, so that the individual frequency components of the data signal are presented in a form suitable for instant analysis and evaluation.

OBJECTS OF THE INVENTION

One object of the present invention, therefore, is to provide a method and apparatus for providing continuous amplitude versus frequency information in real time from a complex analog signal.

Another object of the invention is to provide for the separation of a complex analog signal into its individual frequency components, and for the presentation of such components on a sensitized storage medium by means of a light beam the instantaneous point of impingement of which is indicative of the presence of a particular frequency in the complex analog signal.

A further object of the invention is to provide a device of the class described which is simple in construction and does not require special sensitized paper that must be maintained in a damp condition until it has been exposed.

Other objects, advantages, and novel features of the invention will become apparent from the following detailed description of the invention when considered in conjunction with the accompanying drawings.

DESCRIPTION OF THE PREFERRED EMBODIMENT

Figure 1:
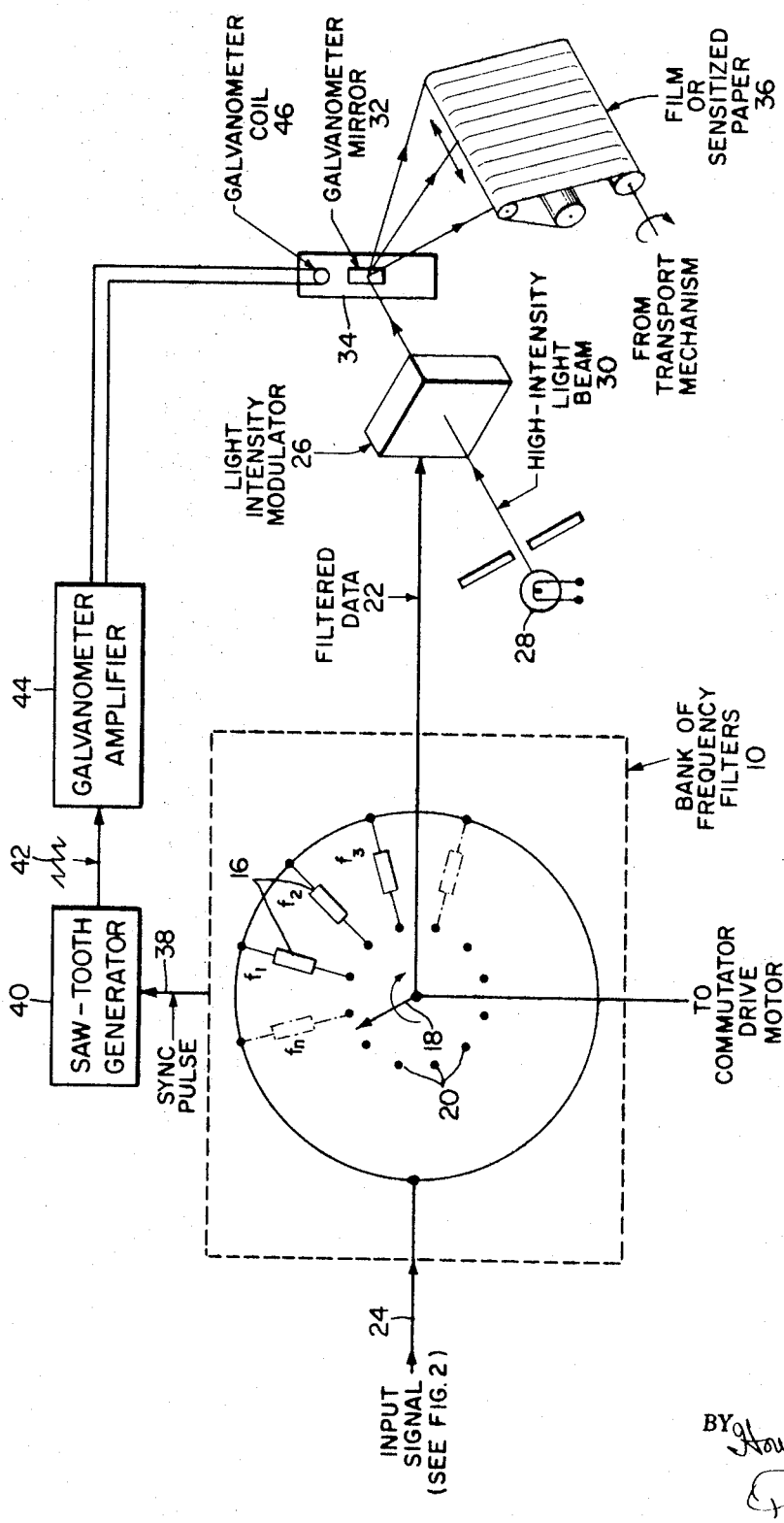
FIG. 1 is a diagram, partially schematic in nature, of a frequency analyzer constructed in accordance with a preferred embodiment of the present invention.

In FIG. 1 of the drawings is illustrated a frequency analyzer designed in accordance with the present concept and operating to determine the respective amplitudes of individual frequencies making up a given complex signal. Included in this analyzer is a bank of frequency filters to which an input signal of the type shown in FIG. 2 may be applied, this filter bank being generally identified in FIG. 1 by the reference numeral 10.

Figure 2:
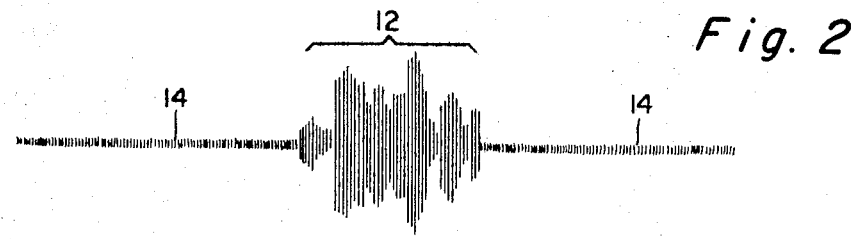
FIG. 2 is the waveform of an input analog signal such as might be analyzed by the system of FIG. 1.

The signal of FIG. 2 may consist of a data portion 12 imposed on a noise background 14. Only the portion 12 is of interest. Purely as an example, the data portion 12 may represent a burst of sound emitted by a marine mammal, in this case a porpoise. Early in the study of such creatures it was discovered that the significant range of frequencies involved was from 10 Hz. to 125 kHz., and an initial problem was to determine the presence or absence of individual frequencies in these sounds.

For such investigations, the frequency bank 10 of FIG. 1 is arranged to include a plurality of frequency filters 16 respectively passing individual frequencies $f_1$—$f_n$ and covering the particular band of interest, in this case from zero to 100 kHz. (see FIG. 3). The number of individual frequency filters employed obviously depends upon the range covered and the degree of accuracy required in the output data. The input signal is applied as shown in FIG. 1 to one terminal of each of the filters, the latter being preferably arranged in sectorial form as illustrated to permit commutation of their respective outputs in a manner now to be described.

A rotating pickup arm 18 is driven by a motor (not shown) to successively engage a plurality of contacts 20 respectively connected to one terminal of each filter element 16. This has the effect of successively connecting each filter 16 to an output conductor 22 so that the individual frequencies $f_1$—$f_n$ present in the input signal arriving over conductor 24 are in effect commutated and successively applied to a light-intensity modulator 26 by way of conductor 22.

A high-intensity light source 28 is arranged to develop a narrow beam 30 of bright light which is directed to the modulator 26 as shown in the drawings. Although the source 28 may be of any suitable type, it is contemplated that a laser will be utilized to produce a thin pencil of coherent, monochromatic light which exhibits a minimum of diffusion. As shown, the modulator 26 acts to vary the intensity of the light beam 30 as a function of the amplitude of the signal present in conductor 22, and, since this signal is representative of the amplitude of a particular frequency component in the input signal at any given instant of time, the intensity of the light output of the modulator 26 will also be representative of this same data.

The modulator 26 may be of any known type. One example which is particularly suitable for employment in the circuit of FIG. 1 is described on pages 220—224 of a text by Monte Ross titled "Laser Receivers" and published in 1966 by John Wiley & Sons.

The modulated light beam 30 which emerges from the unit 26 is directed to the mirror 32 of a conventional galvanometer 34. It is reflected from mirror 32 to fall upon the surface of a roll of film or sensitized paper 36 which is driven at a constant rate of speed by a transport mechanism (not shown).

At one point in each cycle of rotation of the movable arm 18 a pulse is developed and applied over conductor 38 to synchronize the operation of a generator 40, the latter producing a sawtooth wave output as indicated at 42. This sawtooth wave is amplified by the conventional unit 44 and applied to the galvanometer coil 46 so as to deflect the galvanometer mirror 32 in linear fashion for a major portion of each cycle, with a short fly-back period. Each linear deflection of the mirror 32 thus coincides essentially with a cycle of commutation of the input signal by the rotating arm 18.

The modulated light beam 30 is consequently reflected by the oscillating mirror 32 so as to produce an essentially linear trace on the sensitized medium 36, the nonlinearity of this trace being negligible inasmuch as the rate of movement of the film or paper 36 is quite slow, such for example as one-half inch per second. The direction of scanning by the light beam 30 is indicated by the arrows 48.

Figure 3:
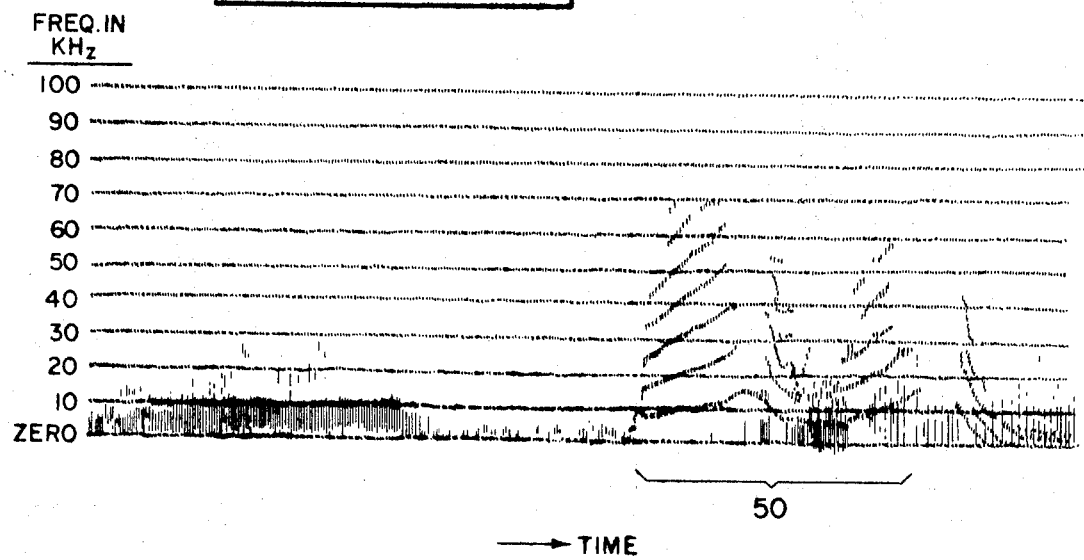
FIG. 3 is a graph of amplitude vs. frequency such as might be obtained when the input signal of FIG. 2 is analyzed by the system of FIG. 1.

The arrangement of FIG. 1 thus results in the development of markings on the film or paper 36 such as shown in FIG. 3. The data region 12 of the input signal (FIG. 2) produces a corresponding region 50 in FIG. 3 in which the presence or absence of components in each frequency band is clearly indicated, as well as the relative amplitude and overall distribution of these components. This presentation indicates certain signal properties warranting additional investigation, and also brings out that other areas may be eliminated from further study.

Figure 4:
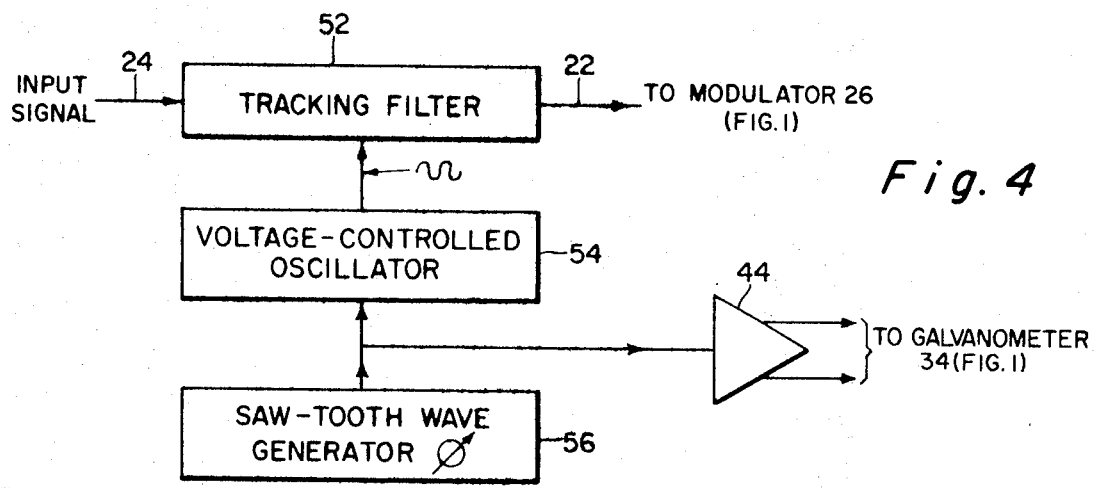
FIG. 4 is a modification of a portion of the frequency analyzer of FIG. 1.

In FIG. 4 of the drawings is set forth one manner in which the mechanically commutated filter bank 10 of FIG. 1 may be replaced by an electronically controlled filter 52 which is periodically swept over the frequency band of interest by a sine wave received from an oscillator 54 the operation of which is in turn controlled by the voltage output of a sawtooth wave generator 56. As the sine wave from oscillator 54 changes in frequency in response to variations in amplitude of the sawtooth wave from generator 56, the filter 52 is swept over the frequency band of interest. This produces in output conductor 22 a signal identical to that supplied to the light intensity modulator 26 in FIG. 1. The sawtooth wave from generator 56 also activates the galvanometer mirror 32 as in FIG. 1. A discussion of the manner in which devices such as the tracking filter 52 operate is found on pages 101-103 of a publication entitled "Phase Lock Tehniques" by Floyd M. Gardner (John Wiley & Sons, New York).

The filter bank 10 of FIG. 1 may contain any desired number of individual filter units, as mentioned above. One especially suitable filter assembly is marketed commercially by the Raytheon Company, and consists of 240 separate filters. It is identified as Anaylzer Model MRFR-30-2.

I claim:

1. A system for displaying in real time frequency components of a complex input signal of analog form, said system comprising:

means for separating said input signal into a plurality of discrete frequency components, said separating means including a tracking filter to which said input signal is applied, a sawtooth wave generator, a voltage-controlled sine wave oscillator receiving the output of said sawtooth wave generator, and means for applying the output of said voltage-controlled oscillator to said tracking filter to cause the latter to periodically sweep over a predetermined frequency band;

a light source having an output in the form of a narrow beam;

means for applying the output of said tracking filter to intensity-modulate said light beam;

a sensitized recording medium; and means for applying the output of said sawtooth wave generator to cyclically deflect said intensity-modulated light beam across said recording medium.